(12) United States Patent
Zellner et al.

(10) Patent No.: US 8,514,787 B2
(45) Date of Patent: *Aug. 20, 2013

(54) SYSTEM, METHOD, AND APPARATUS FOR AN INTEGRATED ANTENNA AND SATELLITE DISH

(75) Inventors: Samuel Zellner, Dunwoody, GA (US); Neale Hightower, Sr., Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,749

(22) Filed: Sep. 13, 2012

(65) Prior Publication Data

US 2013/0019270 A1 Jan. 17, 2013

Related U.S. Application Data

(63) Continuation of application No. 12/120,951, filed on May 15, 2008, now Pat. No. 8,289,898.

(51) Int. Cl.
*H04W 4/00* (2009.01)
*H04N 7/20* (2006.01)

(52) U.S. Cl.
USPC ............... 370/328; 725/63; 725/64; 725/65

(58) Field of Classification Search
USPC ................. 370/328; 725/63, 64, 65
See application file for complete search history.

(56) References Cited

U.S. PATENT DOCUMENTS

| | | | |
|---|---|---|---|
| 2002/0032903 A1* | 3/2002 | Sprunk | 725/1 |
| 2002/0056088 A1 | 5/2002 | Silva et al. | |
| 2002/0062481 A1* | 5/2002 | Slaney et al. | 725/42 |
| 2002/0092015 A1* | 7/2002 | Sprunk et al. | 725/9 |
| 2002/0144274 A1 | 10/2002 | Gaviot et al. | |
| 2003/0026424 A1 | 2/2003 | McGarrahan et al. | |
| 2003/0176204 A1 | 9/2003 | Abraham | |
| 2004/0034827 A1* | 2/2004 | Shen et al. | 714/758 |
| 2004/0055017 A1 | 3/2004 | Delpuch et al. | |
| 2006/0107302 A1 | 5/2006 | Zdepski | |
| 2007/0094687 A1* | 4/2007 | Russell | 725/46 |
| 2007/0192805 A1 | 8/2007 | Dutta et al. | |
| 2007/0194985 A1 | 8/2007 | Monnerat | |
| 2007/0222734 A1 | 9/2007 | Tran | |
| 2008/0039116 A1 | 2/2008 | Abraham | |
| 2008/0310609 A1 | 12/2008 | Brady et al. | |
| 2009/0070796 A1 | 3/2009 | Stomakhin et al. | |
| 2009/0122131 A1 | 5/2009 | Mears | |

* cited by examiner

*Primary Examiner* — Farah Faroul
(74) *Attorney, Agent, or Firm* — Cantor Colburn LLP

(57) ABSTRACT

Systems and methods for an integrated antenna and satellite dish. Exemplary embodiments include an apparatus, including a satellite dish, a wireless antenna coupled to the satellite dish and a coupling box communicatively coupled to the satellite dish and the wireless antenna. Additional exemplary embodiments include a content communication method, including receiving a satellite signal, receiving a first wireless signal, performing coupling box processing on the satellite signal and the wireless signal, transmitting the satellite signal and the wireless signal to a set top box and performing set top box processing on the satellite signal and wireless signal. Further exemplary embodiments include a content communication system, including a satellite dish for receiving content from a satellite, a wireless antenna for receiving content from a wireless network and a coupling box for processing the content from the satellite and the content from the wireless network.

20 Claims, 3 Drawing Sheets

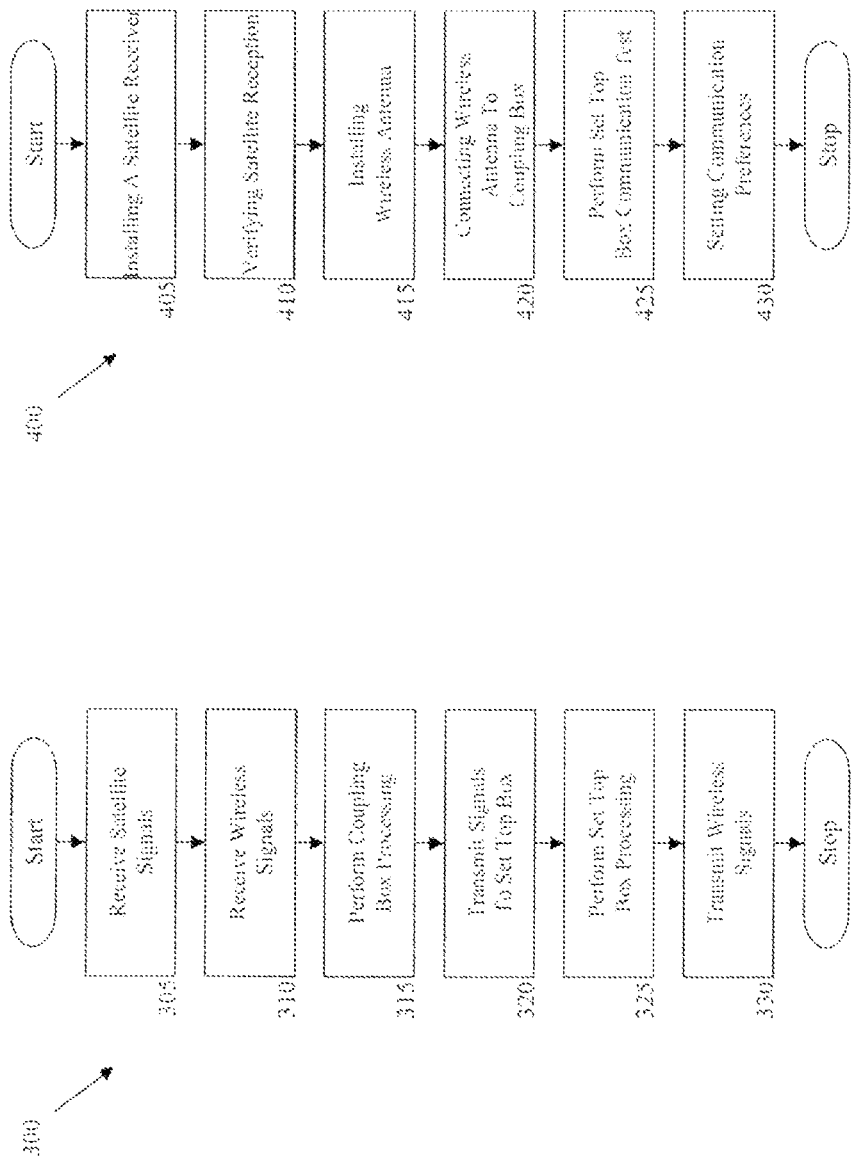

SYSTEM, METHOD, AND APPARATUS FOR AN INTEGRATED ANTENNA AND SATELLITE DISH

BACKGROUND

This is a continuation application of U.S. Non-provisional application Ser. No. 12/120,951 filed May 15, 2008, the contents of which are incorporated by reference herein.

Exemplary embodiments relate generally to telecommunications, and more particularly, to systems, methods, and an apparatus for an integrated antenna and satellite dish.

Currently, direct to home satellite services implement a wired telephone connection for upstream capability, which requires that the subscriber of the satellite service also has landline telephone service and a jack near the satellite box. In addition, satellite networks, particularly video networks, are primarily one-way systems. Thus, two separate networks are required for downstream and upstream capability.

BRIEF SUMMARY

Exemplary embodiments include an apparatus, including a satellite dish, a wireless antenna coupled to the satellite dish and a coupling box communicatively coupled to the satellite dish and the wireless antenna.

Additional exemplary embodiments include a content communication method, including receiving a satellite signal, receiving a first wireless signal, performing coupling box processing on the satellite signal and the wireless signal, transmitting the satellite signal and the wireless signal to a set top box and performing set top box processing on the satellite signal and wireless signal.

Further exemplary embodiments include a content communication system, including a satellite dish for receiving content from a satellite, a wireless antenna for receiving content from a wireless network and a coupling box for processing the content from the satellite and the content from the wireless network.

Other systems and methods according to embodiments will be or become apparent to one with skill in the art upon review of the following drawings and detailed description. It is intended that all such additional systems and methods be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 3 illustrates flow chart of a method implementing an integrated antenna and satellite dish apparatus in accordance with exemplary embodiments; and FIG. 4 illustrates an installation method in accordance with exemplary embodiments.

The detailed description explains the exemplary embodiments, together with advantages and features, by way of example with reference to the drawings.

DETAILED DESCRIPTION OF EXEMPLARY EMBODIMENTS

Exemplary embodiments include systems, methods, and apparatus for an integrated antenna and satellite dish. In exemplary embodiments, a multiplexing apparatus is implemented to integrate the signal from at least one terrestrial antenna with at least one satellite receiver for transmission to a set top box. Exemplary embodiments include a frequency shifting multiplexer that is stand alone or integrated into the satellite dish, which allows one coaxial cable or some other similar communication facility, such as fiber or wireless, to be used for linking at least two antennas from a remote location, such as, the roof to the set-top box, for example. It is appreciated that by having a terrestrial antenna positioned adjacent to a satellite dish one can substantially improve the signal strength and performance of the terrestrial system (e.g., cellular, wifi, WiMax, etc.) because it is higher from ground level, and outdoors vis-à-vis indoor operation of the same terrestrial radio system. In exemplary embodiments, an antenna can be positioned adjacent a subscriber set-top box, in which a signal booster may be implemented if this approach provides sufficient signal level for proper operation. It is appreciated that the systems and methods described herein can be implemented to retrofit existing satellite systems, or can be installed as new installs with an integrated satellite dish and antenna.

Figure 1:
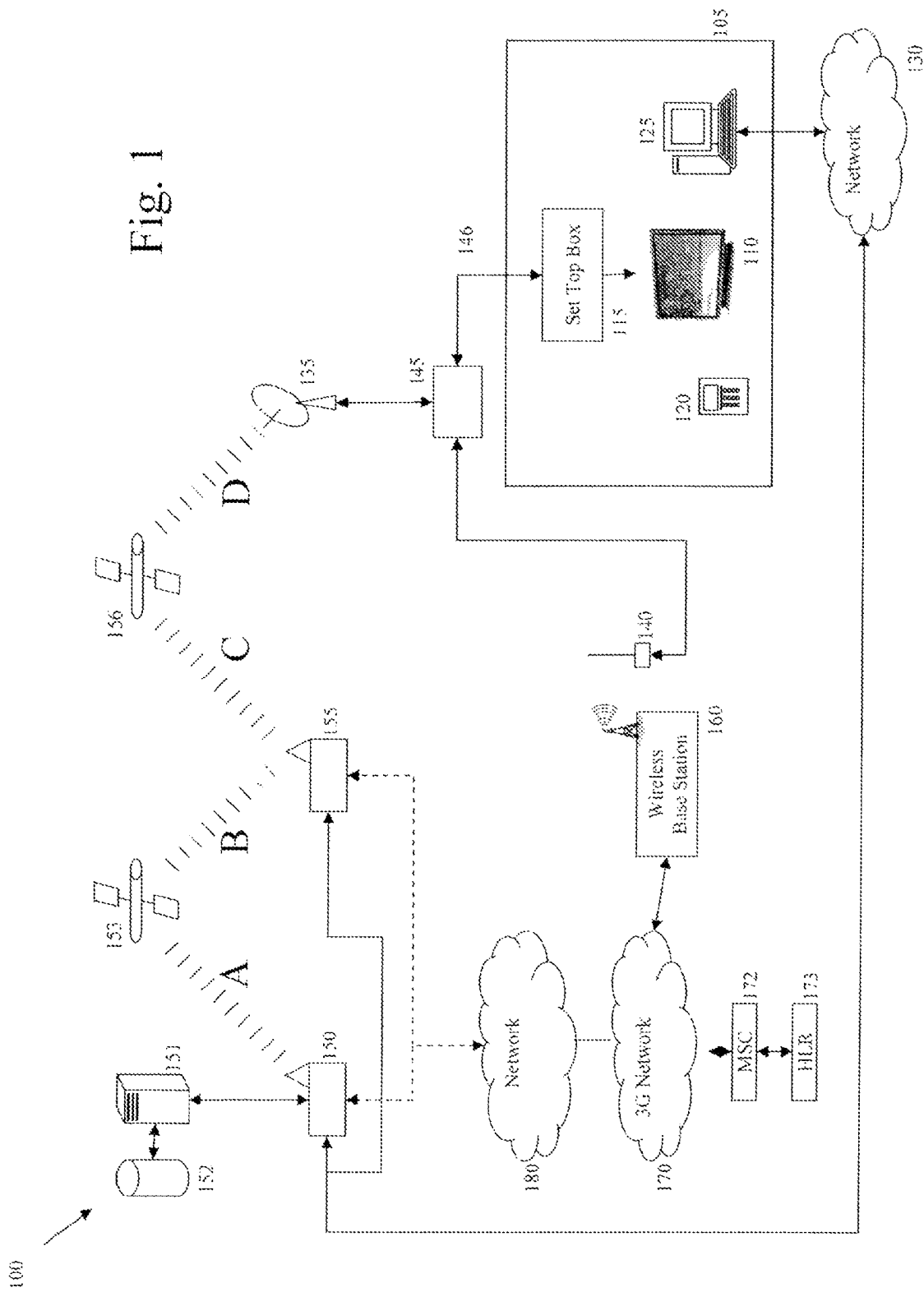
FIG. 1 illustrates a block diagram of an exemplary integrated antenna and satellite dish system.

Turning now to FIG. 1, a block diagram of an exemplary integrated antenna and satellite dish system 100 is now described. For ease of illustration, the system of FIG. 1 depicts a simplified network infrastructure. It is understood that a variety of network components/nodes may be utilized in implementing the embodiments described herein. For example, in exemplary embodiments, the system 100 includes a means for accessing network services for multiple disparate devices using a single sign on procedure. Therefore, the system 100 manages accounts, each of which is established for a community of devices and/or device subscribers, such as those devices and subscribers in a subscriber location 105, which may include a communications device 110 (e.g., a television) coupled to a set top box 115. The accounts may thus include phone, network access and satellite services and may be used to provide access to services associated with exemplary embodiments of the integrated antenna and satellite dish. Furthermore, in exemplary embodiments, one of the devices can be provisioned for the integrated antenna and satellite dish services described herein by associating a device identifier of the communications device with a respective account. According to exemplary embodiments, the account, in turn, identifies each of the communications devices belonging to the community and provides other information as described herein.

It is appreciated to those skilled in the art that the networks discussed herein may include circuit-switched and/or packet-switched technologies and devices, such as routers, switches, and/or hubs, for facilitating communications between various types of communications devices such as the communications device 110. Other networks may include wireline and/or wireless components utilizing, e.g., 802.11 standards for providing over-the-air transmissions of communications.

As discussed above, the system 100 of FIG. 1 includes the subscriber location 105, such as the subscriber's household. The subscriber location 105 can include the communications device 110 in communication with the set top box 115. In exemplary embodiments, the set top box is a device that connects to the communications device 110 and some external source of signal, and turns the signal into content, which is then displayed on the screen. In other exemplary embodiments the communications device 110 is an access point device for other devices in the home or location to utilize the communications paths provided by the antenna and satellite dish. The signal source can be a satellite dish (discussed herein), an Ethernet cable, a coaxial cable, fiber, wireless, a telephone line (including DSL connections), Broadband over Power Line, and an ordinary VHF or UHF antenna. In exemplary embodiments, the content can include any or all of video, audio, Internet webpages, interactive games, or other types of multi-media content. The subscriber location 105 can further include a remote control 120 for control of the communications device 110. The subscriber location 105 can further include a subscriber computer 125 for communication with one or more networks such as a network 130 (e.g., the Internet).

In exemplary embodiments, the subscriber location 105 can further include a satellite dish 135 communicatively coupled to the set top box 115. An antenna 140 configured to receive wireless signals can also be communicatively coupled to the set top box 115. In exemplary embodiments, a coupling box 145 can be connected between the set top box 115 and the satellite dish 135, and further between the set top box 115 and the antenna 140. In exemplary embodiments, power may be supplied from the set top box 115 to the coupling box via a link 146. In exemplary embodiments, as further described herein, communication between the set top box 115 and the coupling box 145 may be directions (e.g., video down from the satellite dish 135 and communication up from the set top box 115 to a Wi-Fi antenna.)

In exemplary embodiments, the system 100 can implement a direct to home (DTH) satellite system, in which programming is received in the subscriber location 105 via a direct broadcast satellite (DBS) provider. A content provider 150 that is coupled to a content provider server 151 and a content database 152 can select programming to broadcast to the subscriber location 105 as described herein. The system 100 can further include a broadcast center 155, which is a central hub for the DTH satellite system. The content provider 150 receives signals from various programming sources, such as from the network 130, and transmits a broadcast signal A to satellites such as a satellite 153 in geostationary orbit, which in turn transmits the content to the broadcast center 155 via broadcast signal B. The broadcast center 155 can in turn transmit a broadcast signal C to another satellite 156. The satellite 156 can then rebroadcast the content via a broadcast signal D to ground locations for reception at receivers such as the satellite dish 135. The subscriber's satellite dish 135 picks up the broadcast signal D from the satellite 156 (or multiple satellites in the same part of the sky) and passes the signal to the set top box or other type of device which provides at least one function of access control, signal conversion or information processing 115 in the subscriber location 105. In exemplary embodiments, the broadcast signal can first undergo processing such as in the coupling box 145 as further described here. The set top box 115 further processes the broadcast signal D and passes the broadcast signal D to the communications device 110 (e.g., a standard television). In exemplary embodiments, the set top box 115 can further control how the coupling box 145 routes signals to and from multiple antennas.

In exemplary embodiments, DBS providers receive programming from national turnaround channels and various local channels. Many turnaround channels also provide programming for cable television, and the local channels typically broadcast their programming over the airwaves. Turnaround channels can have a distribution center that beams their programming to a geostationary satellite. The broadcast center uses large satellite dishes to pick up these analog and digital signals from several sources. Many local stations do not transmit their programming to satellites, but rather receive local signals directly from the broadcaster through fiber-optic cable or an antenna and then transmit them to the central broadcast center 155. The broadcast center 155 converts all of this programming into a high-quality, uncompressed digital stream. At this point, the stream contains a vast quantity of data—about 270 megabits per second (Mbps) for each channel. Prior to transmitting the broadcast signal C, the broadcast center can compress the signal for transmission.)

In exemplary embodiments, as described above, the satellite dish 135 can be integrated with the antenna 140. In exemplary embodiments, the antenna 140 can be configured to transmit and receive wireless signals (e.g., cellular, wifi, WiMax, etc.). For illustrative purposes, the antenna 140 is described as a cellular antenna. As such, the system 100 can further include a wireless base station/cell tower 160. In further exemplary embodiments, a global system for mobile communications (GSM) network 170 or other mobile communications network can be in communication with a call control network [including emerging IP and IP based systems such as IMS for implementing wireless communications via the wireless base station/cell tower 160 to the set top box 115 via the antenna 140. Those skilled in the art also appreciate that the GSM network 170 is in further communication with a mobile switching center (MSC) 172, which is responsible for routing incoming and outgoing calls within the GSM network 170 or to and from the network 180 or to and from other wireless networks. The MSC 172 queries a home location register (HLR) 173, which provides the administrative information required to authenticate, register and locate wireless devices. In exemplary embodiments, the set top box 115 in combination with the antenna 140 can be considered a wireless device for which the MSC 172 can query the HLR 173 for providing the administrative information required to authenticate, register and locate the set top box 115 and antenna 140 combination. In exemplary embodiments, the wireless base station/cell tower 160 can incorporate a femto cell (or Access Point Base Station), which is a scalable, multi-channel two-way communication device that extends the wireless base station/cell tower 160.

Therefore, the set top box 115 (which can include a subscriber identity module (SIM) card) can be in communication with the wireless base station/cellular tower 160, and thus in communication with the content provider 150 and/or the central broadcast center 155 via the GSM network 170, and the network 180. It is therefore appreciated that the set top box 115 can be in communication with the content provider 150 and/or central broadcast center 155 for various back channel control information, user selections, viewing information, updating of channel selection directories, transmitting pay channel stored in the set top box 115 or any other communication that is currently implemented via telephone lines. In exemplary embodiments, a cellular connection can be implemented to create a virtual private network (VPN) or other secure network path between the subscriber location 105 and the content provider 150. It is further appreciated that if the subscriber moves the subscriber location, the subscriber need not contact any local telephone company to hook up service necessary to connect to the set top box 115 when using phone lines. In exemplary embodiments, the set top box 115 and antenna combination can "roam" to different locations and still retain service without having to contact the cellular service provider.

In exemplary embodiments, the set top box 115 can be configured to be a satellite receiver for signals received in the satellite dish 135 and a wireless transmitter/receiver for the antenna 140 as discussed above and further herein. In exemplary embodiments, as discussed further herein, the set top box 115 can further be configured to be a router or wireless router to link other devices in the subscriber location, for example, the subscriber computer 125 for communication via the antenna 140 or via the network 130.

In exemplary embodiments, the set top box can therefore de-scramble the broadcast signal D. In exemplary embodiments, in order to unlock the signal, the set top box 115 can include a decoder chip for a programming package provided by the content provider 150. The content provider 150 can communicate with the chip, via the satellite signal, to make necessary adjustments to its decoding programs. The content provider 150 can occasionally send various signals either via the satellite dish 135 or the antenna 140 for various services such as disrupting illegal de-scramblers, updating channel information and subscription services. The set top box 115 can further convert the signal D to a format that the communications device 110 can support. For example, the broadcast signal is sent as a digital signal that may need conversion to an analog NTSC format or HDTV signal. The set top box 115 can further extract individual channels from the larger bundled broadcast signal D. As described above, the set top box 115 can further keep track of paid channels and periodically phones the content provider 150 via the antenna 140 to communicate billing information. The set top box 115 can further pick up programming schedule signals from the content provider 150 and present this information in an onscreen programming guide (e.g., an electronic programming guide (EPG)).

In exemplary embodiments, the set top box 115 can include a digital video recorder that includes a storage media. In exemplary embodiments, the DVR can be hard-disk based, but may have other suitable storage media such as a cache. It is appreciated that the DVR can have other suitable memory devices for receiving and storing programming and scheduling data. Therefore, a "memory" or "recording medium" can be any means that contains, stores, communicates, propagates, or transports the program and/or data for use by or in conjunction with an instruction execution system, apparatus or device. The memory and the recording medium can be, but are not limited to, an electronic, magnetic, optical, electromagnetic, infrared or semiconductor system, apparatus or device. The memory and recording medium also include, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored. It is appreciated that the DVR may be local on the set top box 115 (as described), or networked, or on an allocated media server storage space.

In exemplary embodiments, the coupling box 145 is configured to receive and multiplex both the signal from the satellite dish 135 and the signal from the antenna 140. As such, a line that connects the coupling box 145 to the set top box 115 (e.g., a coaxial cable) carries a signal containing the multiplexed satellite dish 135 signal and the antenna 140 signal. Therefore, the set top box 115 is further configured to receive separate incoming multiplexed signals for separate processing. In exemplary embodiments, signals outgoing from the set top box 115 include signals for transmission over the antenna 140 when the satellite dish 135 is configured to only receive satellite signals, such as the broadcast signal D. In other exemplary embodiments, when the satellite dish 135 is configured to also transmit signals, the set top box 115 can be configured to multiplex signals for transmission over both the satellite dish 135 and the antenna 140, the multiplexed signal being decoupled at the coupling box 145 for separate transmission over from the satellite dish 135 and the antenna 140. In exemplary embodiments, the coupling box 145 can implement multiplexing via various multiplexing schemes including but not limited to: OFDMA, CDMA, TDMA, or others In exemplary embodiments, the coupling box 145 can be configured to down convert the frequency of the signals received by both the satellite dish 135 and the antenna 140. Those skilled in the art appreciate that the satellite signals are often broadcast in a range (e.g., 12-14 GHz) that may result in loss and noise when transmitted down coaxial cables connected to satellite dishes such as the satellite dish 135. As such, when the satellite signal is received, it is down-converted to a range suitable for transmission in the cable (e.g., ~100 MHz). Furthermore, it is appreciated that wireless signals have a variety of frequencies. For example, cellular signals are broadcast in the range of about 850-900 MHz.

Future wireless networks may operate in radio bands above or below this frequency, and the exact multiplexing arrangement will depend on the band used, as well as the frequency to which the satellite signal is downconverted. Also, the terrestrial systems described herein may include multi-band devices which are capable of operation on several bands, and which select a particular band for operation based on availability and service provider preference. For example, the terrestrial signal might be received at 2.5 GHz, and be down converted to 50 MHz, while the satellite receiver downconverts signals to a range between 100 and 1000 MHz. Alternately, the terrestrial system could operate at 700 MHz and be upconverted to 2.5 GHz for processing by the set-top box. Those skilled in the art will appreciate that the selection of exact frequencies for up and down conversion is based on FCC frequency allocations, system design, and component cost optimization, and that the particular selected frequencies do not present limitations on exemplary embodiments.

In exemplary embodiments, the signals received by the antenna 140 can also be down-converted. However, it is appreciated that the down-conversion associated with the received wireless signals may not be as great as the down-conversion associated with the satellite signal. Furthermore, in exemplary embodiments, the satellite signal may be down-converted to about 900 MHz therefore requiring no down-conversion of the exemplary cellular signal received at the antenna 140. The signals can therefore be multiplexed and transmitted at 900 MHz to the set top box 115. In exemplary embodiments, the coupling box 145 can perform other processing on the received signals such as amplification and filtering. In exemplary embodiments, it is appreciated that there may be one or more available channels for transmitting the multiplexed signal between the coupling box 145 and the set top box 115. As such, the set top box 115 is further configured to identify the proper channel to uplink to receive the multiplexed signal.

In exemplary embodiments, as discussed above, the set top box 115 can be further configured to be a router or wireless router for other network capable devices in the subscriber location 105, such as the subscriber computer 125. As such, the set top box 115 can be directly connected to the network 130 and to the other devices in the subscriber location. In exemplary embodiments, the set top box 115 can share and transmit content received from the satellite dish 135 to devices in the subscriber location 105.

Figure 2:
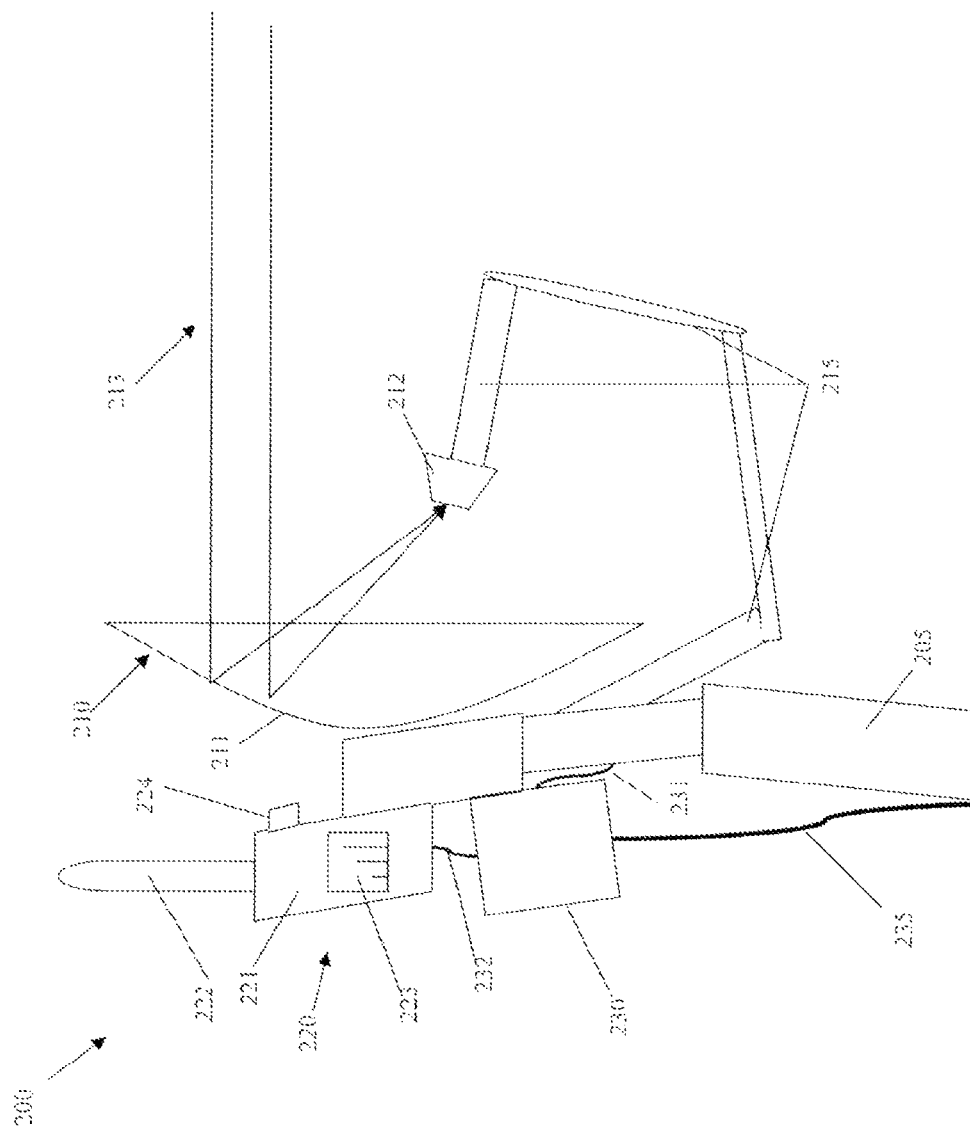
FIG. 2 illustrates a block diagram of an exemplary integrated antenna and satellite dish apparatus.

FIG. 2 illustrates a block diagram of an exemplary integrated antenna and satellite dish apparatus 200. The satellite dish 135 and the antenna 140 illustrated in FIG. 1 are shown as separate components coupled to one another via the coupling box 145. It is appreciated that the satellite dish 135, the antenna 140 and the coupling box 145 can be separate components that are configured to be connected to one another. It is further appreciated that the satellite dish 135, the antenna 140 and the coupling box 145 can be a single integrated apparatus, such as the exemplary integrated antenna and satellite dish apparatus 200 as now described.

In exemplary embodiments, the apparatus 200 can include a central support 205 onto which the components of the apparatus 200 are mounted. The apparatus can further include a satellite dish 210 mechanically coupled to the central support 205. Those skilled in the art appreciate that a satellite dish, such as the satellite dish 210, is a kind of antenna designed to focus on a specific broadcast source. A standard dish can include a parabolic (bowl-shaped) surface 211 and a central feed horn 212. To receive a signal 213 from a satellite, such as the satellite 156, the signal 213 is received onto the surface 211 and reflected onto the central feed horn 212. It is appreciated that the parabolic shape of the satellite dish 211 allows the signal 213 to be reflected onto a single point of the central feed horn 212. In exemplary embodiments, when the satellite dish 210 is configured to transmit, the central feed horn 212 can transmit a signal that is reflected on the surface 211 and accordingly broadcast. The central feed horn 212 can be mounted on a support arm 215, which is mechanically coupled to the central support 205.

In exemplary embodiments, the apparatus can further include a wireless transmitter/receiver 220 mechanically coupled to the central support 205. In exemplary embodiments, the wireless transmitter/receiver 220 can be configured to transmit and receive wireless signals (e.g., cellular, wifi, WiMax, etc.). The wireless transmitter/receiver 220 can include a housing 221 including electronics for processing wireless signals, such as cellular signals as described herein. The wireless transmitter/receiver 220 can further include an antenna 222 for transmission and reception of the wireless signals. The wireless transmitter/receiver 220 can further include a signal strength indicator 223. In exemplary embodiments, the signal strength indicator 223 can include "bars" similar to bars indicating signal strength on cellular telephones. The signal strength indicator 223 can display signal strength to a technician, for example, when installing the apparatus 200 to indicate the strength of the wireless signal in the installation location. In exemplary embodiments, if the technician recognizes that the signal strength is not sufficient in the installation location, the technician can move the apparatus 200 to a different location, or alternatively add a signal booster or make other appropriate adjustments. In exemplary embodiments, the wireless transmitter/receiver 220 can further include a power switch to power the wireless transmitter/receiver 220 on and off. For example, a service provider may offer services that include either a conventional phone line service, or as a premium service, a wireless service, with satellite television packages. A subscriber at the subscriber location 105 may elect not to subscribe to the premium service. As such, the switch 224, which can include a key lock for example, can be placed in an off position to power down the wireless transmitter/receiver 220. As such, the subscriber would use a local telephone provider and implement a conventional phone line with the set top box 115.

In exemplary embodiments the central feed horn 212 of the satellite dish 210 and the wireless transmitter/receiver 220 can be in communication with a coupling box 230. In exemplary embodiments, the central feed horn 212 can be communicatively coupled to the coupling box 230 via an electrical line 231. Similarly, the wireless transmitter/receiver 220 can be communicatively coupled to the coupling box 230 via an electrical line 232. As described herein, the coupling box 230 is configured to receive and multiplex both the signal from the central feed horn 212 and the signal from the wireless transmitter/receiver 220. As such, a line 235 that connects the coupling box 230 to the set top box 115 (e.g., a coaxial cable) carries a signal containing the multiplexed satellite dish 210 signal and wireless transmitter/receiver 220 signal. Therefore, the set top box 115 is further configured to separate incoming multiplexed signals for separate processing. In exemplary embodiments, signals outgoing from the set top box 115 include signals for transmission over the wireless transmitter/receiver 220 when the satellite dish 210 is configured to only receive satellite signals. In other exemplary embodiments, when the satellite dish 210 is configured to also transmit signals, the set top box 115 can be configured to multiplex signals for transmission over both the satellite dish 210 and the wireless transmitter/receiver 220, the multiplexed signal being decoupled at the coupling box 230 for separate transmission over from the satellite dish 210 and the wireless transmitter/receiver 220.

In exemplary embodiments, the coupling box 230 can be configured to down-convert the frequency of the signals received by both the satellite dish 135 and the antenna 140. As described herein to prevent loss and noise when signals are transmitted along the line 235, the frequency of the multiplexed signal can be down-converted. As such, when the satellite signal is received, it is down-converted to a range suitable for transmission in the cable (e.g., ~100 MHz). In exemplary embodiments, the signals received by the wireless transmitter/receiver 220 can also be down-converted. As described herein, the satellite signals and wireless signals can be down-converted and multiplexed and otherwise processed in a variety of ways. As described herein, it is appreciated that the down-conversion associated with the received wireless signals may not be as great as the down-conversion associated with the satellite signal. Furthermore, in exemplary embodiments, the satellite signal may be down-converted to about 900 MHz therefore requiring no down-conversion of the exemplary cellular signal received at the wireless transmitter/receiver 220. The signals can therefore be multiplexed and transmitted at 900 MHz to the set top box 115. In exemplary embodiments, the coupling box 220 can perform other processing on the received signals such as amplification and filtering. In exemplary embodiments, it is appreciated that there may be one or more available channels for transmitting the multiplexed signal between the coupling box 220 and the set top box 115. As such, the set top box 115 is further configured to identify the proper channel to uplink to receive the multiplexed signal.

FIG. 3 illustrates a flow chart of a method 300 implementing an integrated antenna and satellite dish apparatus (e.g., as illustrated in FIGS. 1 and 2) in accordance with exemplary embodiments. In exemplary embodiments, signals can be sent to and from the subscriber location 105 to a broadcast source (e.g., the content provider 150).

As described herein, signals can be received at the subscriber location both via a satellite dish such as the satellite dish 135 and a wireless antenna, such as the antenna 140. As such, at block 305, satellite signals can be received by the satellite dish 135 in accordance with exemplary embodiments as described herein. In addition, at block 310, a wireless antenna at the subscriber location can receive wireless signals. As further described herein, in exemplary embodiments, at block 315, a coupling box can perform processing on the received satellite and wireless signals. In exemplary embodiments, the signals can be multiplexed at the coupling box. Furthermore, the signals can be amplified, filtered and down-converted in accordance with exemplary embodiments, it is appreciated that other processing is contemplated in other exemplary embodiments. At block 320, the multiplexed signal is transmitted from the coupling box to the set top box 115. At block 325, the set top box can perform further processing in accordance with exemplary embodiments as described herein. As described herein, the multiplexed signal can be de-multiplexed to separate the satellite signal from the wireless signal such that the signals can be properly routed to appropriate locations. For example, as described herein, the set top box is also a satellite receiver and can perform operations on the satellite signal such as descrambling the signal.

In exemplary embodiments, signals can also be transmitted from the subscriber location 105. As described herein, signals can be transmitted from the wireless antenna 140. As such, at block 330, the wireless antenna 140 can transmit wireless signals to a broadcast source, such as the content provider 150. For example, the set top box 115 may be preconfigured to periodically transmit billing information that is related to pay programs associated with the subscriber's television package. It is appreciated that conventionally, this information is transmitted via phone line. In exemplary embodiments, the information is transmitted wirelessly via a wireless antenna, such as the wireless antenna 140. It appreciated that conventional DBS systems include a one-way satellite dish in which data is received and not transmitted. For information that is transmitted from the subscriber location, conventional wireline systems are implemented. As described herein, in accordance with exemplary embodiments, the information is transmitted wirelessly. However, it is appreciated that the satellite dish apparatuses described herein can also implement two-way satellite dishes in which information can be received and transmitted via the satellite dish.

As described above, the systems and methods described herein can be implemented to retrofit or make a new installation. Regardless of the type of installation, FIG. 4 illustrates an installation method 400 in accordance with exemplary embodiments. At block 405, a satellite receiver such as the satellite dish 210 is installed. At block 410, an installer can verify satellite reception. At block 415, the installer can install the wireless antenna 220 and verify reception. At block 420, the installer can connect the wireless antenna 220 and the satellite dish 210 to the coupling box 230. At block 425, the installer can perform set top box 115 communications testing to ensure that the communications links are operational. At block 430, the installer and/or user can set communications preferences.

As described above, the exemplary embodiments can be in the form of computer-implemented processes and apparatuses for practicing those processes, such as on the set top box 115. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An apparatus, comprising:
a coupling box communicatively coupled to a satellite dish and a cellular antenna, the coupling box receives a satellite signal from the satellite dish and a cellular communication signal from the cellular antenna;
the coupling box multiplexes both the satellite signal and the cellular communication signal to generate a multiplexed signal comprising both the satellite signal and the cellular communication signal;
the coupling box amplifies the multiplexed signal;
the coupling box transmits the multiplexed signal comprising the satellite signal and the cellular communication signal to a set top box;
the coupling box receives, from the set top box, a return set top box multiplexed signal comprising a return satellite signal and a return cellular communication signal; and
the coupling box decouples the return set top box multiplexed signal into a decoupled signal separated into the return satellite signal and the return cellular communication signal for separate transmission over the satellite dish and the cellular antenna.

2. The apparatus of claim 1, wherein the coupling box determines a proper channel for transmitting the multiplexed signal.

3. The apparatus of claim 1, wherein the coupling box performs down-converting of a frequency of the satellite signal and a frequency of the cellular communication signal.

4. The apparatus of claim 1, wherein the cellular antenna communicatively coupled to the coupling box provides telephone service while the satellite dish provides television service both of which are via the set top box.

5. The apparatus of claim 1, wherein the coupling box transmits the multiplexed signal comprising both the satellite signal and the cellular communication signal to the set top box for de-multiplexing the multiplexed signal, the satellite signal of the multiplexed signal being de-multiplexed to comprise television programming.

6. The apparatus of claim 1, wherein communications between the coupling box and the set top box are bidirectional on a link.

7. The apparatus of claim 1, wherein the set top box transmits the return cellular communications signal for cellular communications to a content service provider via the cellular antenna.

8. The apparatus of claim 1, wherein the coupling box receives billing information from the set top box for transmission over the cellular antenna.

9. A content communication method, comprising:

receiving, by a coupling box communicatively coupled to a satellite dish and a cellular antenna, a satellite signal from the satellite dish and a cellular communication signal from the cellular antenna;

multiplexing both the satellite signal and the cellular communication signal to generate a multiplexed signal comprising both the satellite signal and the cellular communication signal;

amplifying the multiplexed signal;

transmitting the multiplexed signal comprising the satellite signal and the cellular communication signal to a set top box;

receiving, by the coupling box, a return set top box multiplexed signal comprising a return satellite signal and a return cellular communication signal from the set top box; and decoupling the return set top box multiplexed signal into a decoupled signal separated into the return satellite signal and the return cellular communication signal for separate transmission over the satellite dish and the cellular antenna.

10. The method of claim 9, wherein the coupling box determines a proper channel for transmitting the multiplexed signal.

11. The method of claim 9, wherein the coupling box performs down-converting of a frequency of the satellite signal and a frequency of the cellular communication signal.

12. The method of claim 9, wherein the cellular antenna communicatively coupled to the coupling box provides telephone service while the satellite dish provides television service both of which are via the set top box.

13. The method of claim 9, wherein the coupling box transmits the multiplexed signal comprising both the satellite signal and the cellular communication signal to the set top box for de-multiplexing the multiplexed signal, the satellite signal of the multiplexed signal being de-multiplexed to comprise television programming.

14. The method of claim 9, wherein communications between the coupling box and the set top box are bidirectional on a link.

15. The method of claim 9, wherein the set top box transmits the return cellular communications signal for cellular communications to a content service provider via the cellular antenna.

16. The method of claim 9, wherein the coupling box receives billing information from the set top box for transmission over the cellular antenna.

17. A content communication system, comprising:

a satellite dish;

a cellular antenna; and a coupling box communicatively coupled to the satellite dish and the cellular antenna, the coupling box receives a satellite signal from the satellite dish and a cellular communication signal from the cellular antenna;

the coupling box multiplexes both the satellite signal and the cellular communication signal to generate a multiplexed signal comprising both the satellite signal and the cellular communication signal;

the coupling box amplifies the multiplexed signal;

the coupling box transmits the multiplexed signal comprising the satellite signal and the cellular communication signal to a set top box;

the coupling box receives, from the set top box, a return set top box multiplexed signal comprising a return satellite signal and a return cellular communication signal; and the coupling box decouples the return set top box multiplexed signal into a decoupled signal separated into the return satellite signal and the return cellular communication signal for separate transmission over the satellite dish and the cellular antenna.

18. The system of claim 17, wherein the coupling box determines a proper channel for transmitting the multiplexed signal.

19. The system of claim 17, wherein the coupling box performs down-converting of a frequency of the satellite signal and a frequency of the cellular communication signal.

20. The system of claim 17, wherein the cellular antenna communicatively coupled to the coupling box provides telephone service while the satellite dish provides television service both of which are via the set top box.

* * * * *